United States Patent [19]

Oide

[11] Patent Number: 4,762,533
[45] Date of Patent: Aug. 9, 1988

[54] FLAT TYPE RESINOID GRINDING WHEEL

[75] Inventor: Kunimasa Oide, Kawanishi, Japan

[73] Assignee: Daichiku Co., Ltd., Hyogo, Japan

[21] Appl. No.: 933,341

[22] Filed: Nov. 18, 1986

Related U.S. Application Data

[63] Continuation of Ser. No. 794,596, Nov. 4, 1985, abandoned, which is a continuation of Ser. No. 330,818, Dec. 15, 1981, abandoned.

[30] Foreign Application Priority Data

Jul. 27, 1981 [JP] Japan .................................. 56-114967

[51] Int. Cl.$^4$ ............................................. B24D 3/04
[52] U.S. Cl. ......................................... 51/298; 51/296
[58] Field of Search .................................. 51/296, 298

[56] References Cited

U.S. PATENT DOCUMENTS

| 2,806,772 | 9/1954 | Robie | 51/296 |
| 3,476,537 | 11/1969 | Markotan | 51/298 |
| 3,524,286 | 8/1970 | Wohrer | 51/298 |
| 4,253,850 | 3/1981 | Rue et al. | 51/298 |

Primary Examiner—James Derrington
Attorney, Agent, or Firm—Koda and Androlia

[57] ABSTRACT

A flat type resinoid grinding wheel, which comprises abrasive grains and phenol resin bond, contains inorganic substance particles in the abrasive grains. The particles are almost the same as the abrasive grains in size but are lower than the abrasive grains in hardness value. Furthermore, the porosity of the grinding wheel is limited to 15% or less.

2 Claims, No Drawings

FLAT TYPE RESINOID GRINDING WHEEL

This is a continuation of application Ser. No. 794,596 filed Nov. 4, 1985, now abandoned, which is a continuation of application Ser. No. 330,818 filed Dec. 15, 1981, now abandoned.

BACKGROUND OF THE INVENTION

1. Field of the Invention

The present invention relates to a flat type resinoid grinding wheel, and more particularly to an improvement in the flat type resinoid grinding wheel which contains inorganic substance having a lower hardness value than the abrasive grains.

2. Prior Art

A flat type resinoid grinding wheel is, as has been well know, produced in such process that phenol resin is added to and mixed with hard abrasive grains, such as fused alumina, sintered alumina, silicon carbide, and zirconia, etc., the mixture poured into a mold, preheated, pressed, then burned to complete it. Heretofor, to improve the grinding performance of such grinding wheel, all that has been studied is mainly how to obtain higher hardness abrasive grains; as a result, zirconia abrasive grains have been recognized as a better material than fused alumina abrasive grains, and further a diamond-cutter formed by fusedly sticking diamond abrasive grains onto a metal plate has been utilized. However, in a flat type resinoid grinding wheel, even the hardness value of its abrasive grains is set fairly high; as long as it has low porosity, the grinding efficiency resulting has not been improved. Therefore, efforts to improve the grinding efficiency by using super hardness abrasive grains seems to have reached its limit.

The present inventor has found that when the mixture consisting of low hardness natural rock mineral and abrasive grains is pressure molded (This is, however, entirely opposed to the method of the prior art, in which higher hardness abrasive grains are sought to be employed.), extremely high performance grinding wheels could be obtained. Such grinding wheels, already applied for as a patent by the present inventor under U.S. Ser. No. 179,742, now abandoned showed over two time superior performance in plane grinding done by an offset grinding wheel, and also showed over six times superior performance done by cutting wheels to the prior art's one. Mainly described in the patent specification are matters related to offset type grining wheels and cutting wheels, while an application for the invention to a flat type resinoid grinding wheel is merely suggested. However, the flat type resinoid grinding wheel of the present invention may widely vary in size in contrast to an offset grinding wheel and cutting wheel; that is, such large size grinding wheels reaches to over 50 mm in thickness, 600 mm in diameter and 30 kg in weight. In such large size flat type grinding wheel, the abrasive grains are the largest part of the manufacturing cost; therefore, it is important to minimize the amount of abrasive grains to cut the costs.

Generally, in the case of thick and large-diameter flat type resinoid grinding wheels, it is extremely important to keep well balanced three principal elements—abrasive grains, bond, and pores—which are required in manufacturing a grinding wheel. More specifically, since abrasive grains act as a "cutter", they need to be very hard and sharp and also be equal in size to one another; since the bond supports the "cutter", it needs to have suitable adhesion to prevent pore blockage which might occur when the adhesion is too strong and also to prevent rapid wear which might occur when adhesion is too weak; and pores are required to take out the waste so as to prevent pore blockage, which might occur when pores are few, to reduce grinding performance. Consequently, it has been commonly believed that the harder abrasive grains are better material for a grinding wheel, and too much bond and too little number of pores are unfavorable because they cause pore blockage.

SUMMARY OF THE INVENTION

Accordingly, it is a primary object of the present invention to provide a flat type resinoid grinding wheel having excellent grinding performance.

It is another object of this invention to provide a flat type resinoid grinding wheel whose porosity is kept extremely low.

The above-mentioned features and objects of the present invention are accomplished by a unique type of flat resinoid grinding wheel which is formed by pressure molding the phenol resin and the mixture of abrasive grains and low-hardness inorganic substance particles—each particle has almost the same diameter as that of the individual abrasive grain and also has a lower hardness value than that of an abrasive grain, and the porosity thereof is 15% or less, substantially close to non-porous.

DETAILED DESCRIPTION OF THE INVENTION

The present invention is accomplished by a thorough study on the basic idea of the above-identified invention in connection with a flat type resinoid grinding wheel on which the influence of said three principal elements—abrasive grains, bond and pores—particularly appear. As a result, almost the same significant grinding efficiency as that of a resinoid offset grinding wheel o cutting grinding wheel has been obtained by composing the flat type resinoid grinding wheel of this invention in the manner described hereunder.

More particularly and firstly, the low hardness inorganic substance particles which will be mixed with the abrasive grains and phenol resin bond are natural rock mineral or inorganic substance particles artificially sintered which have respectively a hardness value of 2 to 7, preferably 2 to 6, on the old Mohs Hardness scale.

A talc having the hardness value of 1 is too soft to perform the expected effect as a low hardness particle. The inorganic substance particles preferably employed are a gypsum with a hardness value of 2, a calcite with a hardness value of 3, a flourite with 4, an apatite with 5, and an orthoclase with 6; among others are an anydrite (hardness value of 3), an aragoniate (3.5–4), an alunite (4), wollastonite (4.5–5), a spinel (5.5–6.5), an amphibole (5–6), and a pyroxene (5.5–6.5).

Inorganic substance particles having a hardness value of 7 or more are close to that of the abrasive grains and are likely to prevent chip-pocket from being formed, decreasing the grinding efficiency.

Secondly, it is necessary for the size of the individual low hardness particles to be larger or equal to that of the abrasive grain, because if the inorganic substance particle is extremely small or powered, it cannot perform the expected function. The size of it, therefore, shall be determined in such a manner, for instance, that when the size of the abrasive grain is #24, the size of the low hardness inorganic substance particle should be #20 to #24; in a similar manner, when the abrasive grain is #46 in size, the size of the low hardness inorganic substance particle should be #36–#46, and so on.

If the low hardness inorganic substance particle is pulverized, it functions merely as an extending or bulking agent as in the conventional grinding wheels and will be completely mixed with the bond, thus merely functioning as a bond aid.

Consequently, from the above points, the low hardness inorganic substance particle which meets the requirements of the present invention should be within the range of #2 to #7 in hardness value and be almost the same diameter as that of the abrasive grain in size.

Thirdly, as to the abrasive grains utilized in the present invention, a white fused alumina (WA), a brown fused alumina (A), or a silicon carbide (C) of black silicon carbide, which have also been utilized in the prior art, may be utilized. Though the present invention utilizes the above-identified abrasive grains which are well employed conventionally, the grinding wheel thereof can perform superior grinding efficiency to the conventional one in which high-grade abrasive grains, such as fused alumina zirconia (ZA) of the zirconia system or artificial diamond, have been used.

On the other hand, when zirconia abrasive grains are mixed with fused alumina abrasive grains, the mixing effect and pressure effect of the low hardness inorganic material particles may be doubled, remarkably improving the grinding performance. This is caused by an increased grip-effect of the high hardness zirconia abrasive grains which can prevent the abrasive grains from easily dropping off.

Fourthly, the amount of the low hardness inorganic substance particles against the total amount of the particles and the abrasive grains may be determined in the range of 10% to 60% in weight. Even in the case that nearly 60% of inorganic substance particles are mixed, the grinding wheel of this invention can perform almost the same grinding efficiency as marketed grinding wheels; particularly, it shows nearly four times superior grinding performance to that of the marketed one in a cast-iron grinding test.

As can be recognized from the above, according to the present invention a great amount—30% to 60%—of the low hardness inorganic substance particles can be mixed with the abrasive grains while still increasing the grinding performance, the cost of abrasive grains can be effectively reduced.

Fifthly, the manufacturing process of the grinding wheel of this invention is almost the same as that of conventional one. There is, in other words, no particular difference in conditions to mix the materials and to burn; the kind, mixing amount, and compounding manner of the phenol resin and the firing conditions, etc., are not required to be changed from the conventional ones However, at the press-molding stage in the present invention, to substantially reduce the porosity of the finished goods, some excess amount of materials are poured into a mold so as to pressure mold the abrasive grains. The conventional flat type resinoid grinding wheel needs 15% to 20% porosity; a porosity of 15% or less causes pore blockage, abruptly reducing the grinding efficiency. However, in case of the grinding wheel in accordance with the teachings of this invention, into which low hardness particles are being mixed, a porosity of 15% or more causes an increase in wear, decreasing the grinding performance. In other words, such grinding wheel can well demonstrate its grinding effect when its porosity is limited to be 15% or less, Further, when the materials are pressure molded so as to form 3% to 6% porosity—substantially non-porosity—, the grinding wheel demonstrates two to four times superior grinding performance.

Hereunder, the grinding performance achieved by the flat type resinoid grinding wheel of the present invention will be specifically described by its embodiment while pointing out concrete numerical values.

EMBODIMENT

The compound material for the grinding wheel is determined as follows:

The mixture, grain size #24, which comprises 10% of zirconia grains (Z) and 90% of fused alumina alundum (A), is adopted as abrasive grains; while, calcite (main component of lime stone or marble), having the hardness value of 3 and size of #20 to #24, is adopted as the low hardness inorganic substance particles.

The mixing amount of the inorganic substance particles against the abrasive grains are classified in the range of 10% to 60% and the phenol resin of 16% to 18% (external percentage) are mixed with the above each classified mixture consisting of inorganic substance particles and abrasive grains.

Each classified compund material shown above is poured into a mold at the rate of 340 g for one sheet of a grinding wheel, and is pressure molded and fired to form a test flat type resinoid grinding wheel having a size of 180×20×38.

The grinding wheels on which cor.parative performance tests were made are the wheel A which has relatively high porosity and is molded by ordinary method with 10% of low hardness particles, and the wheels B (A24) and C which are now on market.

The performance comparative test is made on several different material-grounds—iron (SS41), test result on which is shown in Table 1; stainless steel (SUS304), in Table 2; and aluminium alloy (A152S), in Table 3.

In any test on several different materials, the flat type resinoid grinding wheel according to the present invention, into which above determined ratio of low hardness inorganic substance particles is mixed and for which the porosity is set at 15% or less, indicated excellent overall performance, which means that two to four times superior performance was demonstrated to conventional or high quality marketed grinding wheels.

More specifically, in the case of the iron grinding test, as is shown ih Table 1, the grinding wheel of this invention had less wear and ground more showing 1.6 times superior relative performance to the conventional marketed grinding wheel. The best result was obtained when 20% to 40% of low hardness particles are mixed in.

In the stainless steel grinding test shown in Table 2, similar results to the above test were obtained. More particularly, though the amount of wear increased, the amount ground by the grinding wheel of this invention per unit period was doubled compared with the conventional grinding wheel. This means that the flat type resinoid grinding wheel of the present invention shows a remarkable increase in the amount ground and can shorten the grinding time.

In the aluminium alloy grinding test, the grinding wheel of this invention in which 10% to 30% of the low hardness particles are mixed showed the best grinding performance. Further, even when 60% of low hardness particles are mixed in, the grinding wheel showed 1.2 of relative performance which is superior to the marketed grinding wheel B. Said relative performance 1.2 is almost three times superior to the comparative grinding wheel C.

As described above, the flat type resinoid grinding wheel provided by the present invention has highly excellent grinding performance.

Scale which is less than said abrasive grains, said calcite particles further consisting of 10 to 60% by weight of the total weight of the abrasive grains and the calcite particles, said mixture being pressure molded and fired.

2. A resinoid grinding wheel of substantially non-porosity consisting essentially of a mixture of abrasive grains, phenolic resin and calcite particles which are not of a powdered form, said calcite particles being substantially equal to or larger than said abrasive grains and

TABLE 1

| MATERIAL GROUND | PHYSICAL PROPERTY | EMBODIMENT | | | | | | REFERENCE EXAMPLE | |
|---|---|---|---|---|---|---|---|---|---|
| | | 1 | 2 | 3 | 4 #1 | 5 | 6 | A | B #3 |
| | | 60 | 50 | 40 | 30 #2 | 20 | 10 | 10 | 0 |
| | | 2.6 | 4.1 | 6.2 | 8.9 | 10.5 | 11.9 | 22.7 | 16.9 |
| SS41 IRON | AMT. OF WEAR (g) | 56.3 | 54.3 | 33.6 | 32.3 | 34.5 | 50.0 | 138.3 | 66.7 |
| | AMT. GROUND (g) | 231.5 | 279.6 | 279.1 | 265.0 | 266.1 | 257.5 | 271.1 | 200.3 |
| | GRINDING RATIO*1 | 4.11 | 5.15 | 8.31 | 8.20 | 7.71 | 5.15 | 1.96 | 3.00 |
| | GRINDING EFFIC. (g/hr)*2 | 1389 | 1677 | 1674 | 1590 | 1596 | 1545 | 1626 | 1201 |
| | OVERALL PERFORM.*3 | 5.70 | 8.63 | 13.91 | 13.04 | 12.31 | 7.96 | 3.19 | 3.61 |
| | RELATIVE PERFORM. | 1.6 | 2.4 | 3.9 | 3.6 | 3.4 | 2.2 | 0.9 | 1 |

*1 GRINDING RATIO = $\frac{\text{AMT. GROUND}}{\text{AMT. OF WEAR}}$
*2 GRINDING EFFICIENCY: AMT. GROUND PER HOUR
*3 OVERALL PERFORMANCE: GRINDING RATIO × GRINDING EFFICIENCY ÷ 1000
1 LOW-HARDNESS PARTICLES (%)
2 POROSITY (%)
3 COMMERCIALLY MARKETED WHEEL

TABLE 2

| MATERIAL GROUND | PHYSICAL PROPERTY | EMBODIMENT | | | | | | REFERENCE EXAMPLES | |
|---|---|---|---|---|---|---|---|---|---|
| | | 7 | 8 | 9 | 10 #1 | 11 | 12 | A | B #3 |
| | | 60 | 50 | 40 | 30 #2 | 20 | 10 | 10 | 0 |
| | | 3.5 | 5.6 | 6.2 | 8.9 | 10.5 | 11.9 | 22.7 | 16.9 |
| SUS304 STAINLESS STEEL | AMT. OF WEAR (g) | 65.5 | 62.2 | 48.4 | 42.6 | 32.5 | 38.8 | 112.2 | 38.1 |
| | AMT. GROUND (g) | 192.2 | 231.6 | 234.2 | 200.7 | 191.5 | 180.0 | 245.5 | 130.8 |
| | GRINDING RATIO*1 | 2.93 | 3.72 | 4.84 | 4.71 | 5.89 | 4.64 | 2.19 | 3.43 |
| | GRINDING EFFIC. (g/hr)*2 | 1153 | 1389 | 1405 | 1204 | 1149 | 1080 | 1473 | 784 |
| | OVERALL PERFORM.*3 | 3.38 | 5.17 | 6.80 | 5.67 | 6.77 | 5.01 | 3.23 | 2.69 |
| | RELATIVE PERFORM. | 1.3 | 1.9 | 2.5 | 2.2 | 2.5 | 1.9 | 1.2 | 1 |

1, #2 and #3 same as in Table 1.
*1, *2 and *3 same as in Table 1.

TABLE 3

| MATERIAL GROUND | PHYSICAL PROPERTY | EMBODIMENT | | | | | | REFERENCE EXAMPLES | | |
|---|---|---|---|---|---|---|---|---|---|---|
| | | 13 | 14 | 15 | 16 #1 | 17 | 18 | A | B #3 | C |
| | | 60 | 50 | 40 | 30 #2 | 20 | 10 | 10 | 0 | 0 |
| | | 3.5 | 5.6 | 6.2 | 12.2 | 14.4 | 11.9 | 22.7 | 16.9 | 19.0 |
| Al52S ALUMINUM ALLOY | AMT. OF WEAR (g) | 64.4 | 67.5 | 64.2 | 75.7 | 74.2 | 45.0 | 78.0 | 63.2 | 46.3 |
| | AMT. GROUND (g) | 148.6 | 169.3 | 162.8 | 240.7 | 278.9 | 233.4 | 146.6 | 130.2 | 71.2 |
| | GRINDING RATIO*1 | 2.31 | 2.51 | 2.54 | 3.18 | 3.76 | 5.19 | 1.88 | 2.06 | 1.54 |
| | GRINDING EFFIC. (g/hr)*2 | 891 | 1015 | 976 | 1444 | 1673 | 1400 | 879 | 782 | 427 |
| | OVERALL PERFORM.*3 | 2.06 | 2.55 | 2.48 | 4.59 | 6.29 | 7.26 | 1.65 | 1.61 | 0.66 |
| | RELATIVE PERFORM. | 1.2 | 1.5 | 1.5 | 2.8 | 3.8 | 4.4 | 1 | 1 | 0.4 |

1, #2 and #3 same as in Table 1
*1, *2 and *3 same as in Table 1

I claim:

1. A resinoid grinding wheel having a porosity in the range of 3 to 6% consisting essentially of a mixture of abrasive grains, phenol resin and calcite particles which are not of a powered form, said calcite particles being substantially equal to or larger than said abrasive grains and having a hardness value of 2 to 6 on Mohs Hardness Scale which is less than said abrasive grains, said calcite particles further consisting of 30–60% by weight of the total weight of the abrasive grains and the calcite particles, said mixture being pressure molded and fired.

* * * * *